(12) United States Patent
Kohno (10) Patent No.: US 9,300,754 B2
(45) Date of Patent: Mar. 29, 2016

(54) INFORMATION PROCESSING SYSTEM, INFORMATION PROCESSING APPARATUS, INFORMATION PROCESSING METHOD, AND PROGRAM

(75) Inventor: Michinari Kohno, Tokyo (JP)

(73) Assignee: Sony Corporation, Tokyo (JP)

( * ) Notice: Subject to any disclaimer, the term of this patent is extended or adjusted under 35 U.S.C. 154(b) by 957 days.

(21) Appl. No.: 12/472,536

(22) Filed: May 27, 2009

(65) Prior Publication Data
US 2009/0300108 A1 Dec. 3, 2009

(30) Foreign Application Priority Data

May 30, 2008 (JP) ................ P2008-143275

(51) Int. Cl.
*G06F 15/16* (2006.01)
*H04L 29/08* (2006.01)
*H04L 29/06* (2006.01)

(52) U.S. Cl.
CPC .......... *H04L 67/303* (2013.01); *H04L 65/4092* (2013.01); *H04L 65/602* (2013.01)

(58) Field of Classification Search
CPC .................................................... H04M 7/006
USPC .......................................... 709/232, 217–227
See application file for complete search history.

(56) References Cited

U.S. PATENT DOCUMENTS

| | | | | |
|---|---|---|---|---|
| 5,854,903 A | * | 12/1998 | Morrison et al. | 709/249 |
| 5,987,061 A | * | 11/1999 | Chen | 375/222 |
| 6,002,722 A | * | 12/1999 | Wu | 375/295 |
| 6,021,158 A | * | 2/2000 | Schurr et al. | 375/211 |
| 6,038,251 A | * | 3/2000 | Chen | 375/222 |
| 6,044,107 A | * | 3/2000 | Gatherer et al. | 375/222 |
| 6,055,268 A | * | 4/2000 | Timm et al. | 375/229 |
| 7,289,453 B2 | * | 10/2007 | Riedel et al. | 370/252 |
| 7,403,993 B2 | * | 7/2008 | John et al. | 709/226 |
| 7,660,512 B2 | * | 2/2010 | Kellner et al. | 386/326 |
| 7,664,872 B2 | * | 2/2010 | Osborne et al. | 709/232 |

(Continued)

FOREIGN PATENT DOCUMENTS

| | | |
|---|---|---|
| EP | 1 655 665 A1 | 5/2006 |
| JP | 10-283288 | 10/1998 |

(Continued)

OTHER PUBLICATIONS

NPL: HyunRyong et al. "UPnP-based QoSAgent for QoS-guaranteed Streaming Service in Home Networks" Networked Media Lab., Dept. of Information and Communications, Gwangju Institute of Science and Technology (GIST) ,Gwangju 500-712, Korea, Device Solution Group, Digital Solution Center, Samsung Electronics, pp. 543-547.*

(Continued)

*Primary Examiner* — Hua Fan
(74) *Attorney, Agent, or Firm* — Sony Corporation (57) ABSTRACT

An information processing system includes: a parent terminal having a storage section storing device information including a drawing capability of a child terminal, a generation section generating transmission data of a user interface or a content in accordance with the device information, and a transmission section transmitting the transmission data to the child terminal; and a child terminal having a receiving section receiving the transmission data, and a display section displaying a user interface screen or a content playback screen on the basis of the transmission data.

9 Claims, 8 Drawing Sheets

(56) References Cited

U.S. PATENT DOCUMENTS

| | | | |
|---|---|---|---|
| 2003/0046401 A1* | 3/2003 | Abbott et al. | 709/228 |
| 2003/0065802 A1* | 4/2003 | Vitikainen et al. | 709/231 |
| 2003/0105812 A1* | 6/2003 | Flowers et al. | 709/203 |
| 2004/0088412 A1* | 5/2004 | John et al. | 709/226 |
| 2004/0215811 A1* | 10/2004 | Bar et al. | 709/232 |
| 2004/0259555 A1* | 12/2004 | Rappaport et al. | 455/446 |
| 2005/0021822 A1* | 1/2005 | Cherkasova et al. | 709/232 |
| 2005/0071494 A1* | 3/2005 | Rundquist et al. | 709/232 |
| 2006/0015637 A1* | 1/2006 | Chung | 709/232 |
| 2006/0085835 A1* | 4/2006 | Istvan et al. | 725/119 |
| 2006/0117371 A1* | 6/2006 | Margulis | 725/131 |
| 2006/0161635 A1* | 7/2006 | Lamkin et al. | 709/217 |
| 2006/0174021 A1 | 8/2006 | Osborne et al. | |
| 2006/0190593 A1* | 8/2006 | Wang et al. | 709/224 |
| 2006/0224691 A1* | 10/2006 | Dutta et al. | 709/217 |
| 2007/0005727 A1* | 1/2007 | Edwards et al. | 709/218 |
| 2007/0106814 A1* | 5/2007 | Son et al. | 709/232 |
| 2007/0168458 A1* | 7/2007 | Costa-Requena et al. | 709/217 |
| 2007/0206621 A1* | 9/2007 | Plamondon et al. | 370/413 |
| 2007/0226365 A1* | 9/2007 | Hildreth et al. | 709/231 |
| 2007/0244980 A1* | 10/2007 | Baker et al. | 709/207 |
| 2008/0086760 A1* | 4/2008 | Jiang et al. | 726/3 |
| 2008/0092047 A1* | 4/2008 | Fealkoff et al. | 715/716 |
| 2009/0028186 A1* | 1/2009 | Schmidt et al. | 370/468 |
| 2009/0106571 A1* | 4/2009 | Low et al. | 713/310 |
| 2009/0144428 A1* | 6/2009 | Bowater et al. | 709/227 |
| 2009/0180533 A1* | 7/2009 | Bushell | 375/240.01 |
| 2010/0011012 A1* | 1/2010 | Rawson | 707/101 |
| 2010/0017457 A1* | 1/2010 | Jumpertz et al. | 709/202 |

FOREIGN PATENT DOCUMENTS

| | | |
|---|---|---|
| JP | 2002-297495 | 10/2002 |
| JP | 2002-342198 | 11/2002 |
| JP | 2004-005582 | 1/2004 |
| JP | 2004-187062 | 7/2004 |
| JP | 2005-108188 | 4/2005 |
| JP | 2005-223430 | 8/2005 |
| JP | 2006-155454 | 6/2006 |
| JP | 2006-345199 | 12/2006 |
| JP | 2007-199952 | 8/2007 |
| JP | 2007-251630 | 9/2007 |
| WO | WO 2008/082064 A1 | 7/2008 |

OTHER PUBLICATIONS

UPNP Forum: "UPNP QOS Architecture: 1.0", XP002552155, pp. 1-28 (2005).

European Search Report dated Nov. 11, 2009, in application No. EP 09 25 1148.

Lee, HyunRyong et al., "UPnP-based QoS Agent for QoS-guaranteed Streaming Service in Home Networks," IEEE Consumer Communications and Networking Conference (CCNC) 2006 Proceedings, vol. 1, Jan. 8, 2006, pp. 543-547.

Communication Pursuant to Article 94(3) EPC mailed from the European Patent Office in European Application No. 09 251 148.4, dated Nov. 17, 2011, 6 pages.

Korean Office Action issued on Aug. 31, 2015 in patent application No. 20090046391.

* cited by examiner

| REGISTRATION ITEM | REGISTRATION DATA |
|---|---|
| DEVICE ID | 00:11:22:33:44:55:66:77 |
| DEVICE TYPE | PORTABLE GAME DEVICE |
| RESOLUTION | 420,272 |
| Link Speed | 11 Mbps |
| Network | Good |
| User Name | taro |
| LANGUAGE | Japanese |
| GENDER | MALE |

PARENT TERMINAL

CHILD TERMINAL 2
DISPLAY EPG

CHILD TERMINAL 1
DISPLAY COUNTERPROGRAM

FIG. 7

INFORMATION PROCESSING SYSTEM, INFORMATION PROCESSING APPARATUS, INFORMATION PROCESSING METHOD, AND PROGRAM

BACKGROUND OF THE INVENTION

1. Field of the Invention

The present invention relates to an information processing system for providing information from a parent terminal to a child terminal, and to an information processing apparatus, an information processing method, and a program.

2. Description of the Related Art

To date, in CE (Consumer Electronics) devices, PCs (Personal Computers), etc., systems in which a user interface screen is operated by a device (child terminal) different from a device main unit (parent terminal) have been familiar. For example, a remote controller, etc., fall under this category.

In recent years, the following systems have come on the market. For example, a system in which a parent terminal is controlled from a mobile terminal, such as a cellular phone, etc., through a wireless network, such as infrared rays, Bluetooth (registered trademark), etc., and a system, in which a same user interface screen as that of a parent terminal can be reproduced and used. Also, there appeared a system having a function of remote play and remote access, in which all of or a part of a user-interface screen and moving-image data that are expressed on a parent terminal can be operated from a child terminal in a PC, and the like (for example, refer to Japanese Unexamined Patent Application Publication Nos. 2002-342198, 2007-251630).

SUMMARY OF THE INVENTION

However, a related-art function of remote play and remote access is based on the assumption that a drawing capability of a child terminal, etc., is fixed. For example, it has been necessary to provide a parent terminal with a user-information screen, moving images, etc., in accordance with the drawing capability of the child terminal in advance.

The present invention has been proposed in view of these circumstances. It is desirable to provide an information processing system capable of providing most suitable data in accordance with a drawing capability of a child terminal, etc., an information processing apparatus, an information processing method, and a program.

According to an embodiment of the present invention, there is provided an information processing system including: a parent terminal having a storage section storing device information including a drawing capability of a child terminal, a generation section generating transmission data of a user interface or a content in accordance with the device information, and a transmission section transmitting the transmission data to the child terminal; and a child terminal having a receiving section receiving the transmission data, and a display section displaying a user interface screen or a content playback screen on the basis of the transmission data.

Also, according to another embodiment of the present invention, there is provided an information processing apparatus including: a storage section storing device information including a drawing capability of a child terminal; a generation section generating transmission data of a user interface or a content; and a transmission section transmitting the transmission data to the child terminal.

Also, according to another embodiment of the present invention, there is provided a method of processing information, including the steps of: a parent terminal generating transmission data of a user interface or a content in accordance with device information including a drawing capability of a child terminal; the parent terminal transmitting the transmission data to the child terminal; the child terminal receiving the transmission data; and the child terminal displaying a user interface screen or a content playback screen on the basis of the transmission data.

Also, according to another embodiment of the present invention, there is provided a program for causing an information processing apparatus to perform processing including the steps of: generating transmission data of a user interface or a content in accordance with device information including a drawing capability of a child terminal; and transmitting the transmission data to the child terminal.

By the present invention, it is possible to achieve a system in which a parent terminal compresses transmission data, or replaces a user interface with character messages in accordance with a child terminal in order to generate transmission data of a user interface or a content in accordance with device information including a drawing capability of the child terminal.

DESCRIPTION OF THE PREFERRED EMBODIMENTS

In the following, detailed descriptions will be given of specific embodiments of the present invention with reference to the drawings. In an information processing system, which is shown as a specific example of the present invention, a data transmission apparatus (parent terminal) generates transmission data in accordance with a drawing capability, a set language, etc., of a data receiving apparatus (child terminal). Here, the parent terminal includes, for example, a television set, a personal computer, a set-top box, a recorder, etc., and has a function of a server providing information in response to a request from a child terminal. In this regard, in this specification, a system is a logical set of a plurality of apparatuses, and is not limited to the case of including individual constituent apparatuses in a same casing.

Figure 1:
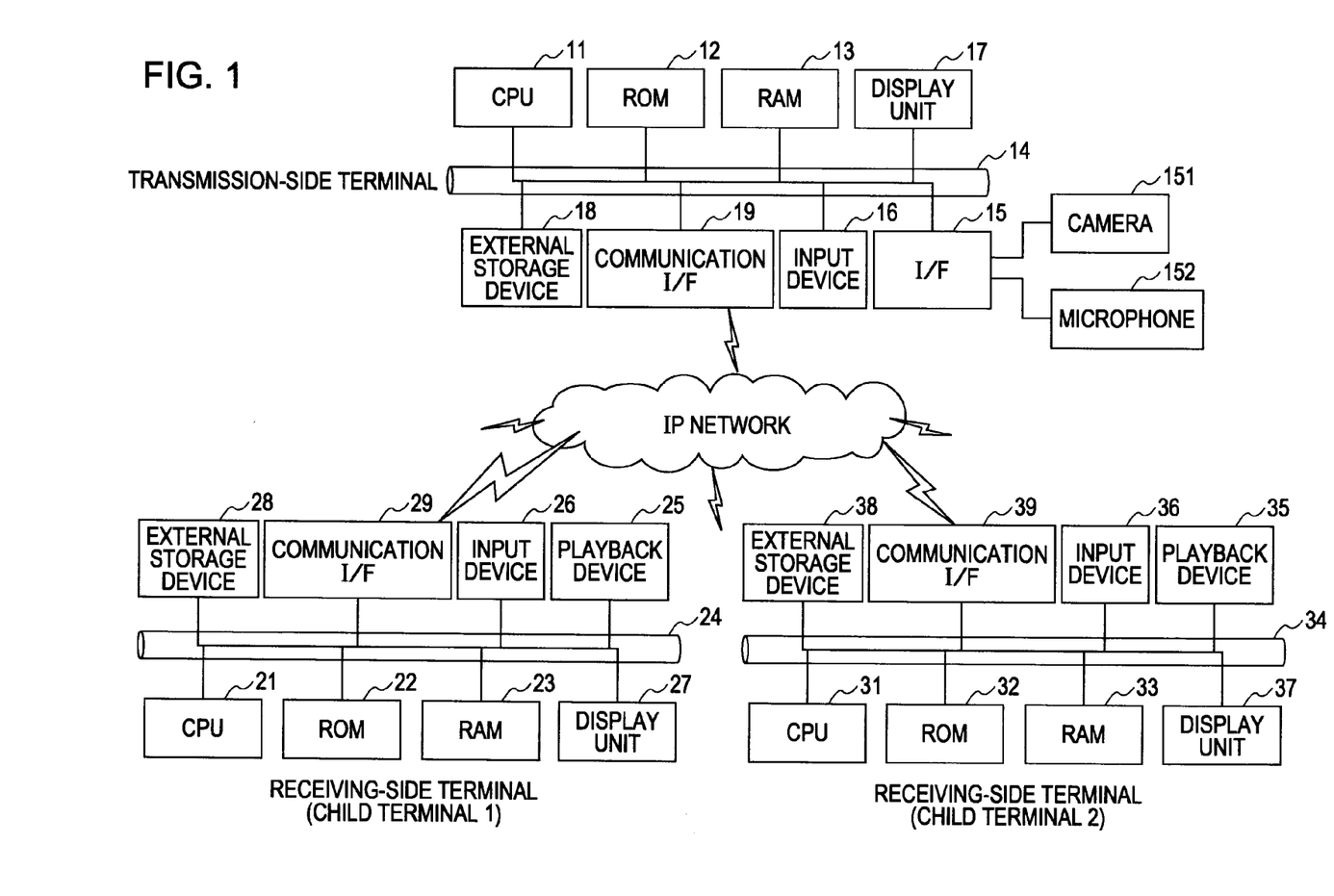
FIG. 1 is a diagram illustrating an information processing system according to an embodiment of the present invention.

FIG. 1 illustrates an information processing system according to an embodiment of the present invention. In a transmission-side terminal, a CPU (Central Processing Unit) 11, a ROM (Read Only Memory) 12, and a RAM (Random Access Memory) 13 are mutually connected through a bus 14. Also, an input/output interface (I/F) 15, an input device 16, a display unit 17, an external storage device 18, and a communication I/F 19 are connected to the bus 14.

The CPU 11 performs various kinds of processing in accordance with programs recorded in the ROM 12 or programs loaded from the external storage device 18 to the RAM 13. The RAM 13 suitably stores necessary data for the CPU 11 to perform various kinds of processing.

A camera 151, a microphone 152, etc., are connected to the input/output interface 15 as necessary. Video data and audio data from the camera 151, a microphone 152, etc., are stored in the external storage device 18.

The input device 16 includes an input device, for example, a touch panel serving also for a display section of the display unit 17, a keyboard, a remote controller including a light receiving section, a mouse, etc.

The display unit 17 includes, for example simply a display section, such as a display, etc., simply an audio output section, such as output terminals, etc., to a speaker or a headphone, or a combination of these.

The external storage device 18 includes, for example a hard disk drive, etc. Also, a removable recording medium including a magnetic disk, an optical disc, a magneto-optical disc, a semiconductor memory, etc., is suitably mounted as necessary. Computer programs read from the removable recording medium are installed in the hard disk drive.

The communication I/F 19 includes, for example a modem, a terminal adapter, a wireless communication device, etc., and controls communication with a child terminal.

Also, in a receiving-side terminal (child terminal 1), a CPU 21, a ROM 22, and a RAM 23 are mutually connected through a bus 24. Also, a playback device 25, an input device 26, a display unit 27, an external storage device 28, and a communication I/F 29 are connected to the bus 24.

The CPU 21 performs various kinds of processing in accordance with a program recorded in the ROM 22 or a program loaded from the external storage device 28 to the RAM 23. The RAM 23 suitably stores necessary data for the CPU 21 to perform various kinds of processing.

The playback device 25 decodes video data and audio data transmitted from the parent terminal as necessary.

The input device 26 includes an input device, for example, a touch panel serving also for a display section of the display unit 27, a keyboard, a remote controller including a light receiving section, a mouse, etc.

The display unit 27 includes, for example simply a display section, such as a display, etc., simply an audio output section, such as output terminals, etc., to a speaker or to a headphone, or a combination of these. Also, the display unit 27 outputs video and sound transmitted from the parent terminal.

The external storage device 28 includes, for example a hard disk drive, etc. Also, a removable recording medium including a magnetic disk, an optical disc, a magneto-optical disc, a semiconductor memory, or the like, is suitably mounted as necessary. Computer programs read from the removable recording medium are installed in the hard disk drive.

The communication I/F 29 includes, for example a modem, a terminal adapter, a wireless communication device, etc., and controls communication with a parent terminal. Also, the communication I/F 29 transmits an operation signal from the input device to the parent terminal.

Also, in a receiving-side terminal (child terminal 2), a CPU 31, a ROM 32, and a RAM 33 are mutually connected through a bus 34. Also, a playback device 35, an input device 36, a display unit 37, an external storage device 38, and a communication I/F 39 are connected to the bus 34. In this regard, each section is the same as that of the child terminal 1, and thus the description thereof will be omitted.

In such information processing apparatus, the transmission-side terminal (parent terminal) captures content data from the camera 151, the microphone 152, and the other input/output interface into the external storage device 18 and the RAM 13. In this regard, the content data may be stored in the external storage device 18, etc., in advance, or may be received through an IP network.

The parent terminal has a function of a server providing a user interface for operating the content data or the parent terminal. The user interface is a user interface for exchanging information between the parent terminal and a user, and includes, for example, a screen of an EPG (Electronic Program Guide), a menu screen, and the like.

Also, the parent terminal has a function of generating a content and a user interface in accordance with the child terminal. In this regard, if it is not necessary to generate new data for the child terminal, the parent terminal may directly use data held by the parent terminal.

Also, the parent terminal transmits data of a content and a user interface to the child terminal through the communication I/F 19. For a transmission line, a wired network or a wireless network, such as an IP (Internet Protocol) network, etc., can be used.

The receiving-side terminals (the child terminals 1, 2) receive content data and screen data of a user interface from the parent terminal through the communication I/Fs 29, 39, and temporarily store the data into the RAMs 23, 33, etc. The data temporarily stored in the RAMs 23, 33, etc., is subjected to processing by the CPUs 21, 31, and then is output to the playback devices 25, 35 and the display units 27, 37. The display units 27, 37 display a content image and a user-interface image, and the playback devices 25, 35 output sound.

Figure 2:
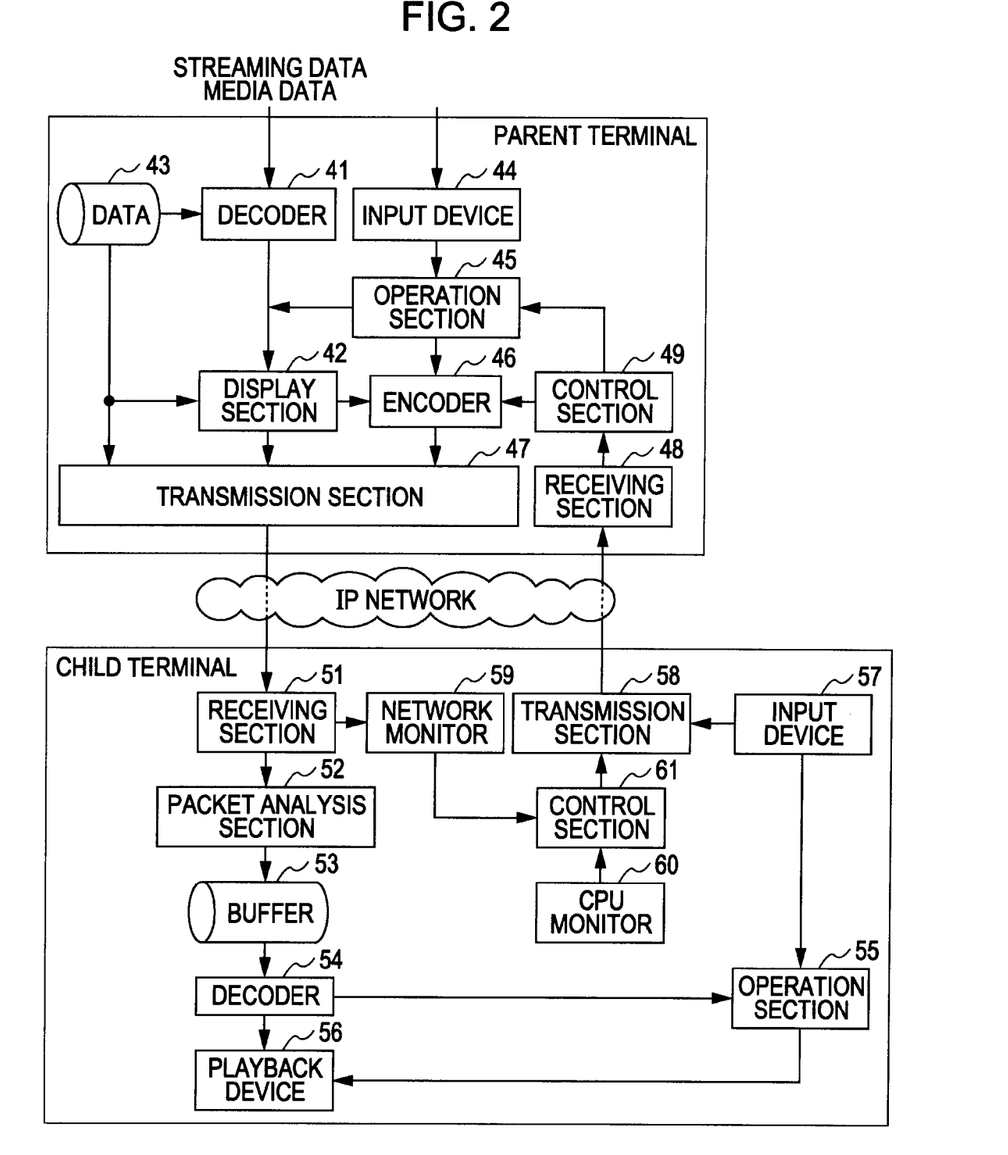
FIG. 2 is a functional block diagram of the information processing system.

FIG. 2 is a functional block diagram of the information processing system. In this regard, it is not necessary that all the functions in FIG. 2 are included in the parent terminal and the child terminal. For example, a function of storing content data may be included in another apparatus.

The parent terminal includes a decoder 41, a display section 42, a data storage section 43, an input device 44, an operation section 45, an encoder 46, a transmission section 47, a receiving section 48, and a control section 49.

The decoder 41 decodes stream data, such as MPEG2 (Moving Picture Experts Group Part2), MPEG4 (Moving Picture Experts Group Part4), etc., medium data or data in the data storage section 43.

The display section 42 includes a display device, such as an LCD (Liquid Crystal Display), etc., and displays a content and a user interface, which are decoded by the decoder 41.

The data storage section 43 includes a hard disk drive, etc., and stores content data. Also, as described below, the data storage section 43 stores device information, such as a drawing capability, a set language, etc., of each child terminal as a table. Also, the data storage section 43 stores setting information which is personalized for each child terminal or user.

The input device 44 includes an input device, such as a remote controller, a mouse, etc. The operation section 45 controls, for example, to play back a content on the basis of a control signal from the input device 44 or the control section 49.

The encoder 46 generates compressed data on the basis of device information of a child terminal. Also, the encoder 46 generates compressed data on the basis of an instruction from the control section 49.

The transmission section 47 transmits data stored in the data storage section 43 or compressed data generated by the encoder 46. The receiving section 48 receives a control signal from a child terminal, and outputs the signal to the control section 49.

The control section 49 instructs the operation section 45 to generate compressed data, or to play back a content on the basis of an operation signal from a child terminal.

In this regard, each of these functional sections is configured for each terminal or for each user, and a multi-access function is achieved. Thus, it is possible to connect a plurality of child terminals.

In the parent terminal having such a configuration, the decoder 41 decodes content data from a network or content data from the data storage section 43, and playback-display the content data to the display section 42. If the content data is compressed or encrypted, the decoder 41 converts the content data into necessary data. Also, in the parent terminal, the encoder 46 compresses content data or a user interface to be playback-displayed on the parent terminal, and transmits the data in real time to the child terminal.

Also, the encoder 46 changes a data compression rate in accordance with a control signal from the child terminal. The control signal includes, for example a calculation capability of a child terminal, the amount of traffic of the network between the parent terminal and the child terminal, an instruction from a child terminal, etc. The control section 49 controls the encoder on the basis of the control signal.

For example, the child terminal notifies that the child terminal can decode and play back an moving image of the SD (Standard Definition) quality in real time, and thereby the device information, such as a resolution, etc., is changed. The parent terminal compresses data to that quality, and transmits the data to the child terminal. Also, if the child terminal wants only a user interface, the child terminal notifies that to the parent terminal, and thereby only the user interface is transmitted.

In this regard, the parent terminal may transmit only necessary data depending on a load on the parent terminal and for convenience in service regardless of an instruction of a child terminal. That is to say, the parent terminal may transmit only a user interface or only a single sound out of multi-language sound depending on a load state and convenience of the parent terminal.

The child terminal includes a receiving section 51, a packet analysis section 52, a buffer 53, a decoder 54, an operation section 55, a playback device 56, an input device 57, a transmission section 58, a network monitor 59, a CPU monitor 60, and a control section 61.

The receiving section 51 receives content data or user interface data transmitted from the parent terminal through a network. In this regard, the network may be either wireless or wired.

The packet analysis section 52 reads a header, etc., of packet data received by the receiving section 51, and obtains a packet number, a time stamp, etc. The decoder 54 decodes packet data held by the buffer 53.

The operation section 55 operates a user interface screen on the basis of an operation signal from the input device 57. The playback device 56 outputs video and sound of user interface and a content.

The input device 57 includes an input device, such as a remote controller, a mouse, etc. The transmission section 58 transmits a control signal of content playback on the basis of an operation signal of the input device 57. Also, the input device 57 transmits a network receiving capability level and a calculation capability level of the child terminal in sequence as control information.

The network monitor 59 monitors the amount of traffic of a network, and outputs the amount of traffic to the control section 61. The CPU monitor 60 monitors usages of the CPUs 21, 31, and outputs the usages to the control section 61.

The control section 61 generates a level of a network receiving capability as a control signal, and generates a level of calculation capability on the basis of a CPU usage as control information.

In the child terminal having such a configuration, the receiving section 51 receives content data or user information data from the parent terminal through the network. After the child terminal receives the data, the decode 54 decodes the data as necessary, and the playback device 56 plays the data back. Here, if user interface data is transmitted, the operation of the operation section 55 is accepted, and input from the input device 57 is accepted. Also, the child terminal transmits an operation signal from the input device 57 to the parent terminal as a control signal, and inputs the control signal to the operation section 45 of the parent terminal. Thereby, it is possible to function an operation input of the child terminal as if it were an operation input at the parent terminal, and to achieve a function of interface synchronization and coexistence.

Also, the network monitor 59 monitors the amount of traffic between the parent terminal and the child terminal, and notifies a level of a receiving capability of the network to the parent terminal. Thereby, it is possible to achieve a system which dynamically corresponds to a change in the network environment.

Also, the CPU monitor 60 monitors usages of the CPUs 21, 31, and notifies a level of calculation capability to the parent terminal. Thereby, it is possible to achieve a system which dynamically corresponds to a load state of the child terminal.

Figure 3:
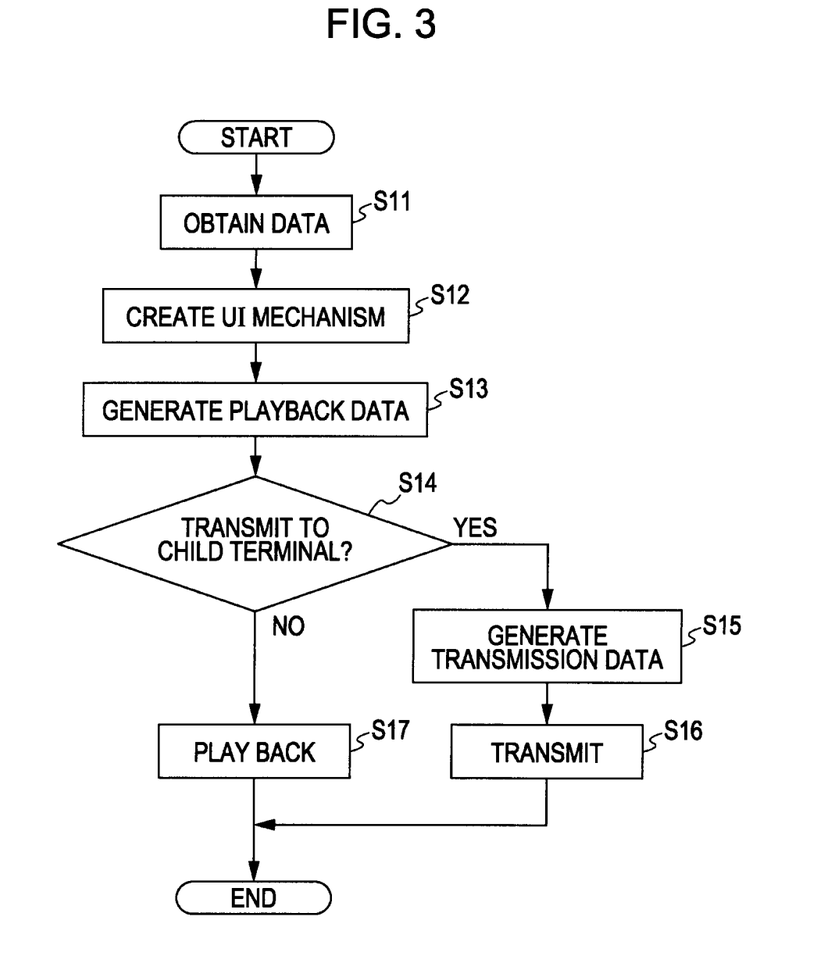
FIG. 3 is a flowchart illustrating an example of data transmission operation of a parent terminal.
Figure 4:
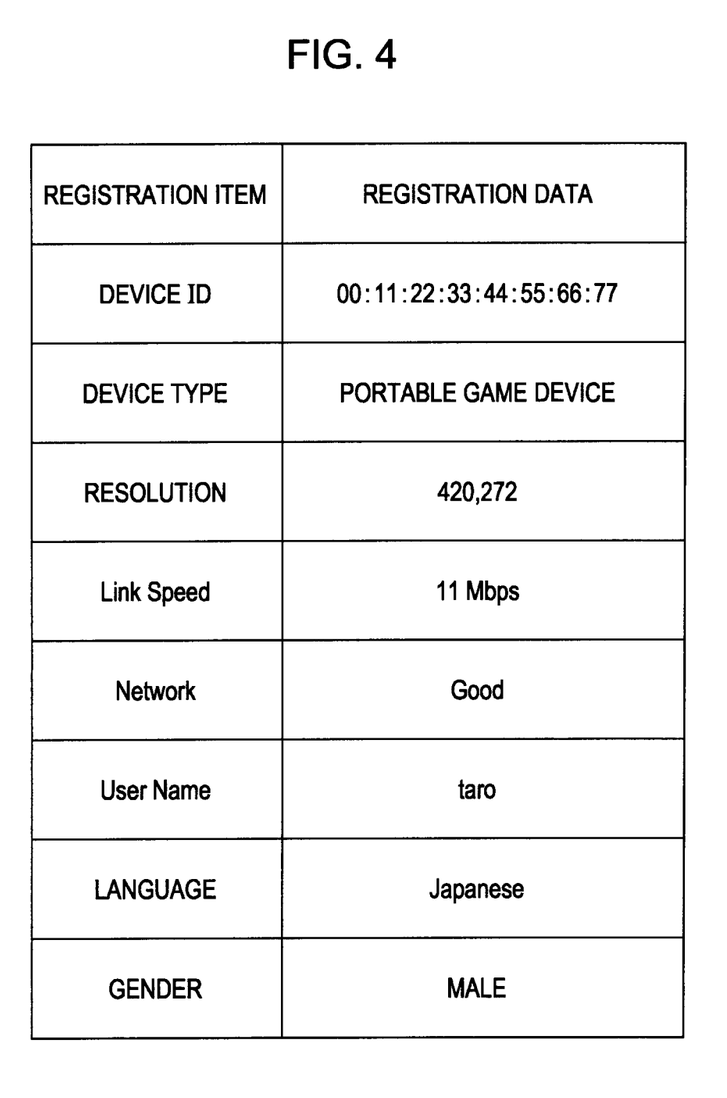
FIG. 4 is a diagram illustrating an example of registration of device information.

Next, a description will be given of a data transmission operation of the parent terminal with reference to a flowchart shown in FIG. 3. Here, the data storage section 43 stores, for example device information of a child terminal as shown in FIG. 4. Registration items of this device information includes a device ID, a device type, a resolution, a transfer rate (Link Speed), a network state (Network), a user attribute, etc. For the user attribute, a user name, a language, a gender, etc., are stored. In this regard, the registration items of the device information may be registered in the parent terminal before a connection is established with the parent terminal, or the device information may be obtained at the time when a network connection is established between the parent terminal and the child terminal.

In step S11, the control section 49 obtains device information data from the data storage section 43. Also, the control section 49 obtains control information including a receiving capability level and a calculation capability level of the child terminal from the child terminal through the receiving section 48.

In step S12, the control section 49 creates a user interface (UI) mechanism in response to a request. Here, if the child terminal makes a request for transmission of content data, the control section 49 generates a user interface on the basis of the device information and the control information of the child terminal. For example, from a resolution indicating a drawing capability, a device ID, a device type, etc., which are registered in the device information, the control section 49 generates a user interface screen on the basis of determination of whether to create a same user interface screen as that of the parent terminal, to create a user interface screen which is easier than the parent terminal, or a user interface screen in a text format. Also, the control section 49 creates a user interface screen on the basis of a receiving capability level and a calculation capability level of the child terminal. Also, the control section 49 creates a user interface screen in the language corresponding to a language in the user attribute, and determines a color of a user interface screen in accordance with a gender of the user attribute.

In step S13, the control section 49 generates playback data of a content in response to a request. Here, if the child terminal makes a request for transmission of content data, the control section 49 generates playback data on the basis of the device information and the control information of the child terminal. For example, the encoder 46 converts playback data into data having a resolution registered in the device information.

Also, the control section 49 dynamically converts the playback data into, for example data having a lower resolution than the resolution registered in the device information from a transfer speed of the device information, a network state, a receiving capability level and a calculation capability level of the control information, etc. Also, the control section 49 generates playback data having sound and subtitles in accordance with the language of the user attribute.

In step S14, the control section 49 determines whether to transmit a user interface or playback data to the child terminal. Specifically, the control section 49 makes a determination depending on whether the child terminal has requested for transmission of a user interface or a content. If the control section 49 performs transmission to the child terminal, the processing proceeds to step S15, whereas if the control section 49 does not perform transmission to the child terminal, the processing proceeds to step S17.

In step S15, the control section 49 generates transmission data (packet data) of the user interface or the content which is generated in accordance with the child terminal. In step S16, the transmission section 47 transmits the packet data to the child terminal, and terminates the data transmission operation.

In step S17, the control section 49 displays the user interface or the content generated in step S12 or in step S13 to the display section 42 of the parent terminal, and terminates the data transmission operation.

In this manner, if the child terminal has made a request for data transmission of a user interface or a content, it is possible to provide a user interface or a content which is most suitable for the child terminal by generating data of a user interface or a content for the child terminal in accordance with a drawing capability and language information or the child terminal.

Also, it is possible to respond to the device information of the child terminal in real time by generating a user interface or content data for the child terminal on the basis of a transfer speed of the device information, a network state, a receiving capability level and a calculation capability level of the control information, etc.

Figure 5:
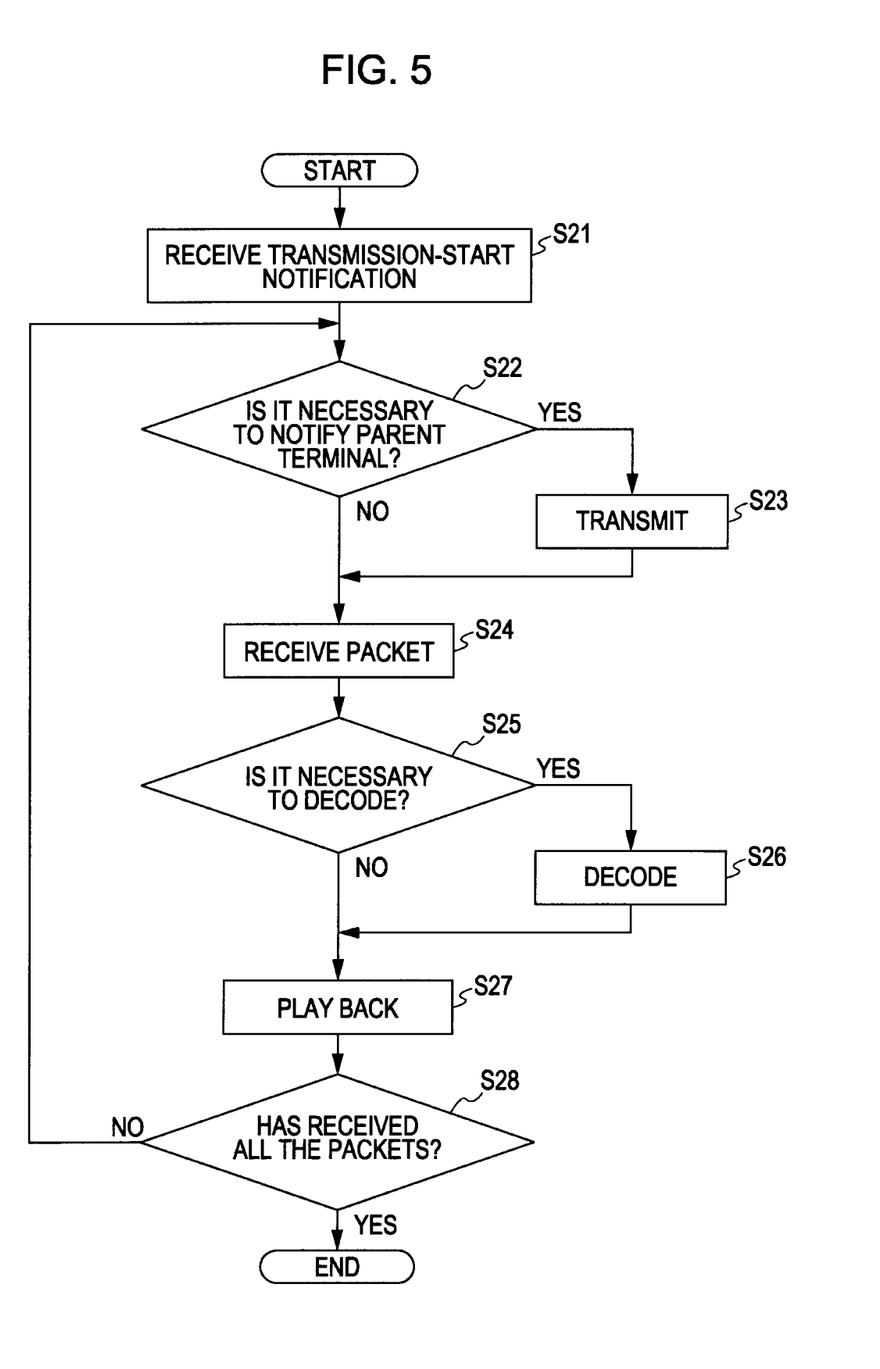
FIG. 5 is a flowchart illustrating an example of data receiving operation of a child terminal.

Next, a description will be given of a data receiving operation of the child terminal with reference to a flowchart shown in FIG. 5. In step S21, the receiving section 51 receives a notification of transmission start from the parent terminal.

In step S22, the control section 61 determines whether it is necessary to notify to the parent terminal. Specifically, if the network monitor section 59 determines that the amount of traffic is a threshold value or more, the control section 61 notifies this to the parent terminal as a receiving capability level. Also, if the CPU monitor section 60 determines that the CPU usage is a threshold value or more, the control section 61 notifies this to the parent terminal as a calculation capability level (step S23). Also, if the control section 61 does not notify the control signal, the processing proceeds to step S24.

In step S24, the receiving section 51 receives packet data of a user interface or a content from the parent terminal.

In step S25, the packet analysis section 52 reads a header, etc., of the packet data received by the receiving section 51, and obtains a packet number, a time stamp, etc., and determines whether it is necessary to perform decoding. If the decoding is necessary, the decoder 54 decodes packet data held in the buffer 53 (step S26).

In step S27, the playback device 56 outputs video and sound of the user interface or the content received from the parent terminal.

In step S28, the packet analysis section 52 determines whether all the packets of the user interface or the content have been received. If all the packets have not been received, the processing returns to step S22. If all the packets have been received, the data receiving operation is terminated.

In this manner, by the child terminal notifying a receiving capability level and a calculation capability level to the parent terminal, it is possible for the parent terminal to provide a user interface or a content which is most suitable for the device state of the child terminal.

Next, a description will be given of an example of a specific operation of an information processing system according to the present embodiment with reference to the drawings.

Figure 6:
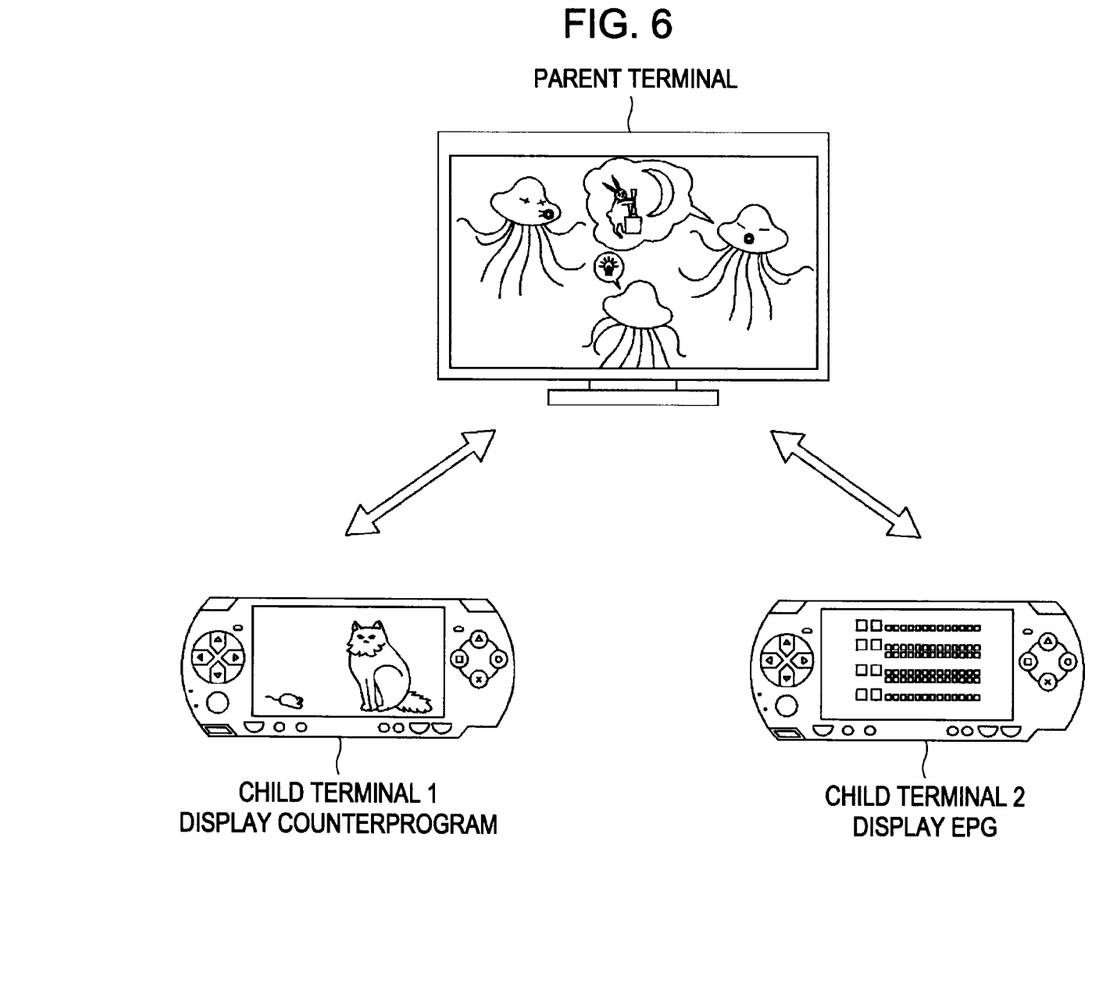
FIG. 6 is a diagram illustrating a specific example 1 of the information processing system.

FIG. 6 is a diagram illustrating a specific example 1 of the information processing system. The parent terminal displays a content, and at the same time, is transmitting data of a content of a counterprogram, which is different from the content displayed on the parent terminal, to the child terminal 1. Also, the parent terminal is transmitting data of a user interface of EPG (Electronic Program Guide).

In the specific example 1, the parent terminal playback displays one of the contents out of two moving images (contents) by itself. Also, the parent terminal performs compression processing on the other of contents on the basis of the device information of the child terminal 1. Specifically, the encoder 46 encodes content data in real time in accordance with the resolution registered in the device information. In this regard, the two contents may be any one of the contents received from the network, the contents obtained from general broadcasting, or the contents stored in the data storage section 43 of the parent terminal.

Also, the parent terminal generates data of an EPG user interface on the basis of the device information of the child terminal 2. Specifically, the encoder 46 encodes user interface data in real time in accordance with the resolution registered in the device information.

Thus, it is possible for the parent terminal to provide most suitable data for the drawing capabilities of the child terminal 1 and the child terminal 2.

Also, the parent terminal dynamically converts data of a content and a user interface into data having a lower resolution than the resolution registered in the device information from a transfer speed of the device information of the child terminal 1 and child terminal 2, respectively, a network state, a receiving capability level and a calculation capability level of the control information, etc., transmitted from the child terminal 1 and child terminal 2. Thus, the parent terminal can correspond to the receiving capabilities and the calculation capabilities of the child terminal 1 and child terminal 2, respectively.

Figure 7:
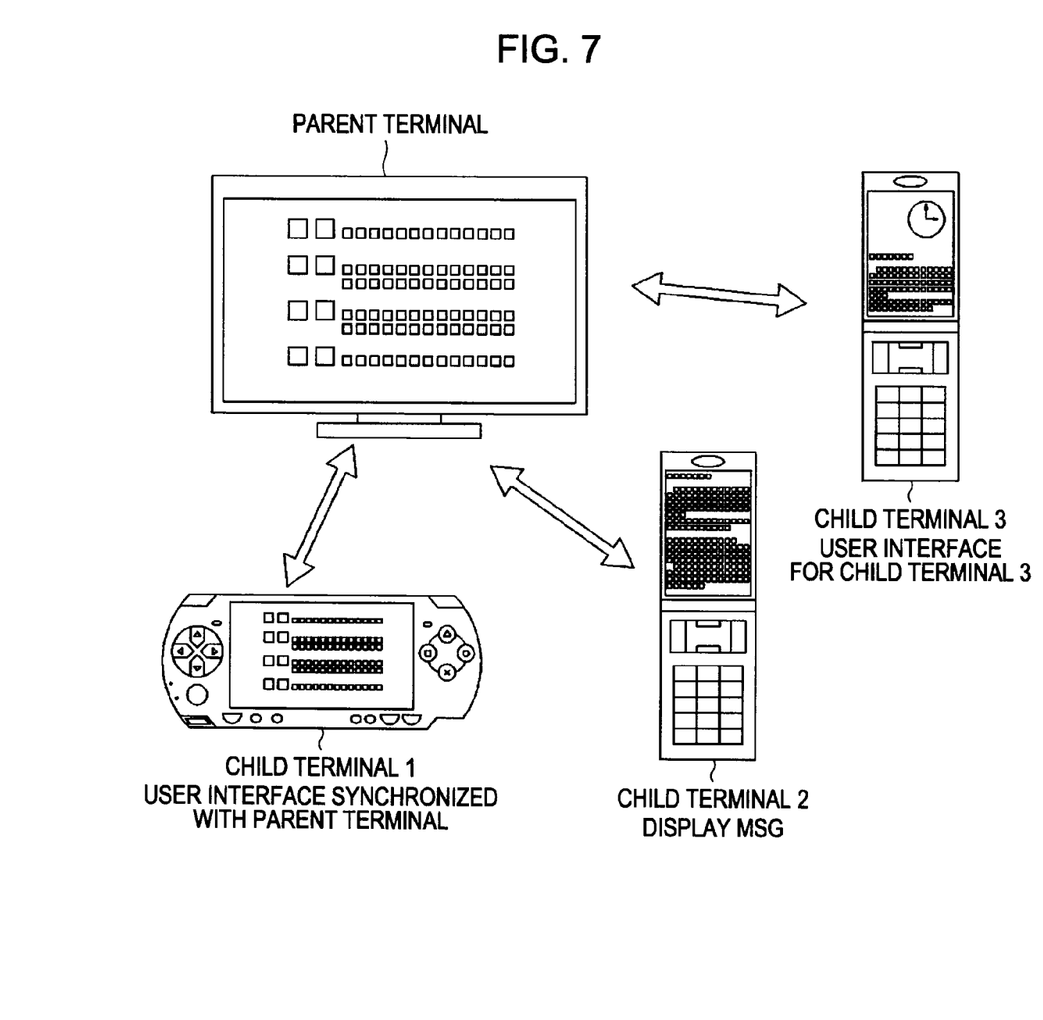
FIG. 7 is a diagram illustrating a specific example 2 of the information processing system.

Also, FIG. 7 is a diagram illustrating a specific example 2 of the information processing system. The parent terminal displays a menu screen as a user interface, and at the same time, is transmitting data of the same menu screen as that of the parent terminal to the child terminal 1. Also, the parent terminal is transmitting data of a menu screen in text format to the child terminal 2. Also, the parent terminal is transmitting data of a menu screen having a different configuration from the display of the parent terminal to the child terminal 3.

In the specific example 2, the encoder 46 of the parent terminal encodes same user interface data as that displayed on the parent terminal in real time in accordance with the resolution registered in the device information of the child terminal 1. Thus, the child terminal 1 can process this user interface directly as an interface of the child terminal 1.

Also, the parent terminal reads a personalized user interface which is configured to meet a user of the child terminal 2 from the data storage section 43, and creates a menu screen. In this regard, the data storage section 43 stores personalized setting information for each child terminal or for each user together with the device information, and thus it is possible to provide a different menu screen for each child terminal or for each user.

Also, the parent terminal creates a user interface which is partly different from the menu screen of the parent terminal in accordance with the drawing capability and the calculation capability on the basis of the device information of the child terminal 3. Specifically, if the parent terminal determines that the drawing capability and the calculation capability are low on the basis of the device information of the child terminal 3, the parent terminal extracts a part of metadata of the menu, and creates a menu screen for displaying a text. Thereby, it is possible to display a menu screen without imposing a large load on the child terminal 3.

Figure 8:
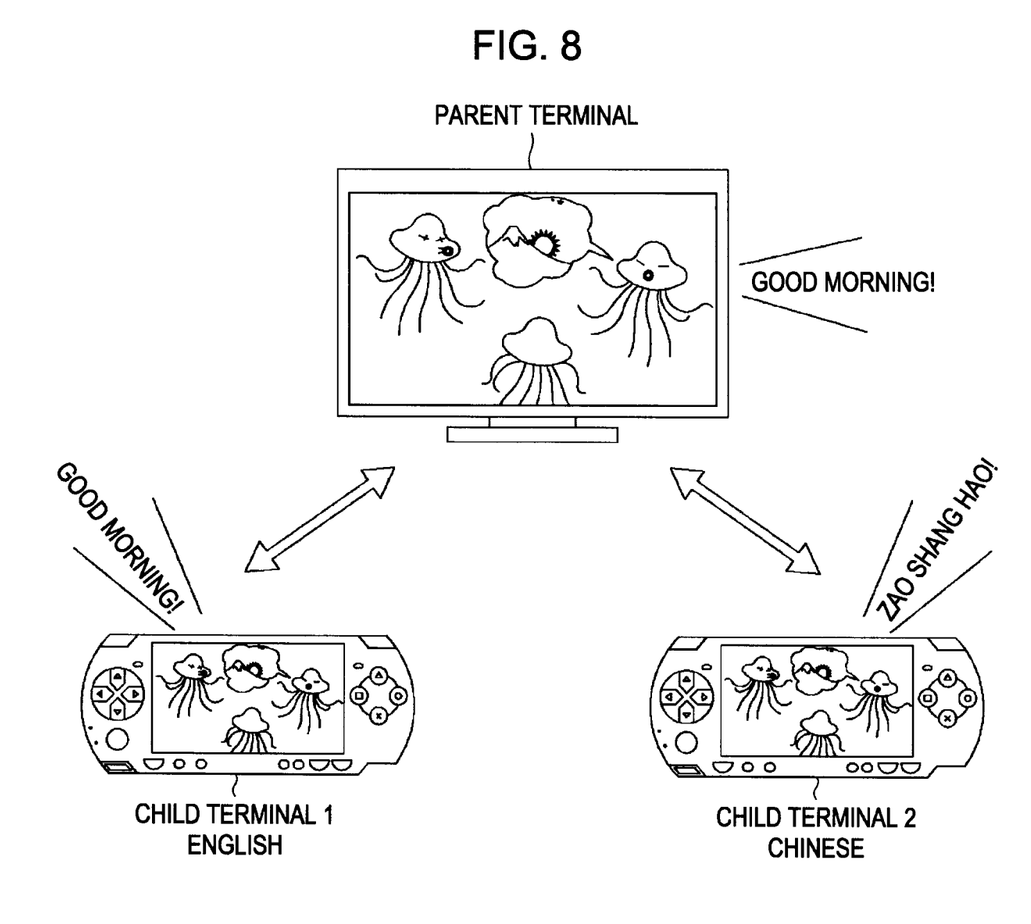
FIG. 8 is a diagram illustrating a specific example 3 of the information processing system.

Also, FIG. 8 is a diagram illustrating a specific example 3 of the information processing system. The parent terminal displays a content, and at the same time, is transmitting data of a same content as that displayed on the parent terminal to the child terminal 1 and the child terminal 2.

In the specific example 3, the parent terminal displays a content on the display section 42, and encodes the content data in real time in accordance with the resolution registered in the device information of the child terminal 1 and child terminal 2. Also, the parent terminal transmits sound data of the language in accordance with language information registered in the device information. In the example shown in FIG. 8, the language information of the parent terminal is Japanese, the language information of the child terminal 1 is English, and the language information of the child terminal 2 is Chinese. In this case, the parent terminal selects English data and Chinese data from the content data, and transmits the data to the child terminal 1 and the child terminal 2, respectively. Thus, it is possible for the child terminals to play back the sound data in different language from that of the parent terminal.

In this regard, it is possible to change a language in operation by the child terminal notifying the set language to the parent terminal during playback of a content, and changing the registered language information. Also, not only sound data is transmitted in accordance with the language information, but also subtitles may be transmitted.

As described above, by the present invention, it is possible to provide user interfaces that can be operated at a plurality of child terminals, and individually personalized user interfaces by processing and transmitting data to meet the capability of a child terminal, preference of a user, and setting information. Also, it is possible to dynamically change data to be transmitted to a child terminal in accordance with the playback capability of the child terminal and a network state. Also, it is possible to reflect a history or preference of a user of the child terminal by storing setting information from the child terminal, etc., in the parent terminal side.

The present application contains subject matter related to that disclosed in Japanese Priority Patent Application JP 2008-143275 filed in the Japan Patent Office on May 30, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
    a parent terminal comprising:
        a storage section storing device information including a drawing capability of a terminal;
        a generation section generating transmission data of a user interface or a content in accordance with the drawing capability and device information, wherein the device information comprises at least one of a device type, device identifier, and a device resolution;
        an encoding section configured to modify a data compression rate based on a received control signal and compress the generated transmission data based on the modified data compression rate; and
        a first transmission section transmitting the transmission data to the terminal; and
    a terminal comprising:
        a receiving section receiving the transmission data;
        a display section displaying a user interface screen or a content playback screen on the basis of the transmission data;
        a capability monitoring section monitoring at least one of a calculation capability level and a receiving capability level of the terminal; and
        a second transmission section transmitting the control signal including the at least one of calculation capability level and receiving capability level of the terminal to the parent terminal,
    wherein the transmission data of the user interface is generated in response to a request from the terminal,
    wherein the calculation capability level is based on a CPU usage value, and
    wherein the receiving capability level is indicative of a network capacity between the parent terminal and the terminal.

2. The information processing system according to claim 1, wherein the generation section changes the amount of the transmission data on the basis of the control signal.

3. The information processing system according to claim 1, wherein the device information includes user attribute information, and
    the generation section generates transmission data of a user interface or a content in accordance with the user attribute information.

4. The information processing system according to claim 3, wherein the parent terminal includes a control section changing the device information of the terminal when the user attribute information of the terminal is changed.

5. The information processing system according to claim 1, wherein the device information includes language information, and
    the generation section generates transmission data of user interface or a content in a language in accordance with the language information.

6. The information processing system according to claim 5, wherein the parent terminal has a control section changing the device information of the terminal in accordance with a change in the language information of the terminal.

7. An information processing apparatus, comprising:
- a storage section storing device information including a drawing capability of a terminal, the terminal having a calculation capability monitoring section monitoring a calculation capability of the terminal;
- a generation section generating transmission data of a user interface or a content in accordance with the drawing capability and device information, wherein the device information comprises at least one of a device type, device identifier, and a device resolution;
- an encoding section configured to modify a data compression rate based on a received control signal and compress the generated transmission data based on the modified data compression rate; and
- a transmission section transmitting the transmission data to the terminal; and
- a receiving section receiving from the terminal the control signal including level of at least one of calculation capability level and receiving capability level of the terminal to the parent terminal,
  - wherein the transmission data of the user interface is generated in response to a request from the terminal,
  - wherein the calculation capability level is based on a CPU usage value, and
  - wherein the receiving capability level is indicative of a network capacity between the parent terminal and the terminal.

8. A method of processing information, comprising the steps of:
- generating, by a parent terminal, transmission data of a user interface or a content in accordance with device information including at least one of a drawing capability of a terminal, a device type, device identifier, and a device resolution;
- modifying a data compression rate based on a received control signal;
- compressing the generated transmission data based on the modified data compression rate;
- transmitting, by a first transmission section of the parent terminal, the transmission data to the terminal;
- receiving, by the terminal, the transmission data; and
- displaying, by the terminal, a user interface screen or a content playback screen on the basis of the transmission data,
- monitoring, by a capacity monitoring section of the terminal, at least one of a calculation capability level and a receiving capacity level of the terminal, and
- transmitting, by a second transmission section of the terminal, the including at least one of calculation capability level and receiving capability level of the terminal to the parent terminal
  - wherein the transmission data of the user interface is generated in response to a request from the terminal,
  - wherein the calculation capability level is based on a CPU usage value, and
  - wherein the receiving capability level is indicative of a network capacity between the parent terminal and the terminal.

9. A non-transitory computer-readable recording medium which stores a computer program for causing an information processing apparatus to perform processing comprising the steps of:
- generating transmission data of a user interface or a content in accordance with device information including at least one of a drawing capability of a terminal, a device type, device identifier, and a device resolution;
- modifying a data compression rate based on a received control signal;
- compressing the generated transmission data based on the modified data compression rate;
- transmitting, by a first transmission section of the parent terminal, the transmission data to the terminal,
- monitoring, by a capacity monitoring section of the terminal, at least one of a calculation capability level and a receiving capacity level of the terminal, and
- transmitting, by a second transmission section of the terminal, the including at least one of calculation capability level and receiving capability level of the terminal to the parent terminal,
  - wherein the transmission data of the user interface is generated in response to a request from the terminal,
  - wherein the calculation capability level is based on a CPU usage value, and
  - wherein the receiving capability level is indicative of a network capacity between the parent terminal and the terminal.

* * * * *